3,849,573
NOVEL VINYLCARBAMATE DERIVATIVES OF PHENYLPROPANOLAMINE

Henry Cecil Caldwell, Ambler, Pa., assignor to Smithkline Corporation
No Drawing. Original application Feb. 23, 1971, Ser. No. 118,159, now Patent No. 3,769,317. Divided and this application July 2, 1973, Ser. No. 376,057
Int. Cl. A61k 27/00
U.S. Cl. 424—311                    5 Claims

ABSTRACT OF THE DISCLOSURE

Vinylcarbamate derivatives of phenylpropanolamine having antitussive activity. Method of preparation comprises reacting phenylpropanolamine with the appropriate acetoacetic acid ester or amide in any suitable organic solvent.

---

This is a division of application Ser. No. 118,159, filed Feb. 23, 1971, which has issued into U.S. Pat. No. 3,769,317.

This invention relates to new organic compounds having valuable pharmacodynamic properties. More specifically this invention relates to vinylcarbamate derivatives of phenylpropanolamine having the following structural formula:

FORMULA I

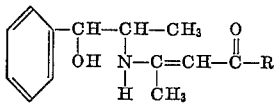

wherein:

R is a lower alkoxy or a di-loweralkylamino group. The term lower alkoxy and loweralkyl is here and elsewhere employed to designate a chain containing from one to four carbon atoms.

The preferred and most advantageous compounds of this invention are the compounds wherein R is ethoxy, tertiary-butoxy and diethylamino.

The novel compounds of this invention are particularly useful as bronchodilator and antitussive agents. The similarity in therapeutic activity of phenylpropanolamine and the compounds of this invention may be explained by the occurrence of an in vivo hydrolysis of the vinylcarbamates to the phenylpropanolamine after administration. The compounds of this invention are therefore particularly advantageous as antitussives and bronchodilators because the hydrolysis results in a slower onset of action with a delayed time of peak effect.

The novel compounds of this invention as set forth in Formula I are prepared by reacting molar equivalents of phenylpropanolamine and the appropriate ester or amide of acetoacetic acid in an organic solvent according to the following synthetic procedure:

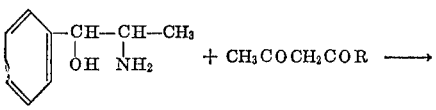

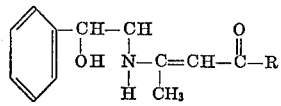

The phenylpropanolamine derivatives as represented by Formula I are preferably employed in combination with either a liquid or solid nontoxic pharmaceutical carrier. A wide variety of pharmaceutical forms useful for oral ingestion may be employed. Advantageously the preparation may take the form of tablets, capsules, powders, troches or lozenges. When a solid form is employed the pharmaceutical carrier may be, for example, lactose, magnesium stearate, starch, gums, such as acacia, terra alba, stearic acid, sorbitol, mannitol, ethyl cellulose or gelatin. The amount of solid carrier will vary widely but preferably is from 25 mg. to about 1 gm. If a liquid carrier is used, the preparation can be in the form of a syrup, elixir, liquid suspension, ampule, or soft gelatin capsule.

Similarly the carrier or diluent can include any time delay material well known to the art, such as glyceryl monostearate or glyceryl distearate alone or with a wax.

The pharmaceutical forms comprising the above novel phenylpropanolamine compounds are administered in dosage units internally, preferably orally. Advantageously equal daily doses are administered to provide a daily dosage regimen which produces antitussive activity. Each dosage unit will contain the active medicament in an amount of about 10 mg. to about 100 mg. preferably from about 25 mg. to about 50 mg. Advantageously equal doses will be administered 2 to 4 times daily with the daily dosage regimen being about 20 mg. to about 400 mg. preferably from about 50 mg. to about 200 mg.

The following examples are not limiting but are illustrative of compounds of this invention and the procedures for their preparation.

EXAMPLE 1

A mixture of 15.1 g. of phenylpropanolamine and 13.0 g. of ethylacetoacetate in 50 ml. of benzene is heated at reflux for about 3 hours until the calculated amount of water is collected. The warm mixture is treated with charcoal and cooled to yield 3-($\beta$-hydroxy-$\alpha$-methylphenethyl)aminocrotonic acid, ethyl ester as a white solid having a melting point of 92.5–93.5° C.

EXAMPLE 2

A mixture containing 15.1 g. of phenylpropanolamine and 15.8 g. of $t$-butyl acetoacetate in 65 ml. of benzene is heated at reflux for about two hours until 0.1 mole of water is collected in the Dean-Stark apparatus. When half of the benzene is distilled, hexane is added which yields an oil on cooling. The solvent is decanted and the oil is washed with hexane. Excess solvent is removed by aspirator to give pure 3-($\beta$-hydroxy-$\alpha$-methylphenethyl) aminocrotonic acid, $t$-butyl ester.

EXAMPLE 3

A mixture of 30.2 g. of phenylpropanolamine and 31.4 g. of N,N-diethyl acetoacetamide in 150 ml. of benzene is heated at reflux for about two hours until 0.2 mole of water is collected. The mixture is decolorized with charcoal and diluted with hexane. The precipitate formed on cooling is N,N-diethyl-3-($\beta$-hydroxy-$\alpha$-methylphenethylamino)-crotonamide having a melting point of 86–87° C.

EXAMPLE 4

Ingredients:                                      Mg./capsule
3 - ($\beta$ - Hydroxy - $\alpha$ - methylphenethyl)-aminocrotonic acid, $t$-butyl ester _____ 25
Peanut oil _____ 100

Disperse the peanut oil in the ester and place in a soft gelatin capsule.

One capsule is administered orally four times a day.

EXAMPLE 5

Ingredients:                                       Mg./tablet
3-($\beta$ -Hydroxy - $\alpha$ - methylphenethyl) - aminocrotonic acid, ethyl ester _____ 50
Calcium sulfate dihydrate _____ 100
Sucrose _____ 25
Starch _____ 15
Talc _____ 5
Stearic acid _____ 3

The sucrose, calcium sulfate and ethyl ester are thoroughly mixed and granulated with hot 10% gelatin solution. The wetted mass is passed through a #16 U.S. standard mesh screen directly onto drying trays. The granules are dried, mixed with the starch, talc and stearic acid, passed through a #60 U.S. standard mesh screen and compressed into tablets.

One tablet is administered twice a day

EXAMPLE 6

Ingredients: Mg./capsule
N,N-Diethyl - 3 - (β-hydroxy-α-methylphenethyl-amino)crotonamide _____ 75
Lactose _____ 125

The ingredients are thoroughly mixed and filled into a hard gelatin capsule.

One capsule is administered three times a day.

What is claimed is:

1. A pharmaceutical composition having antitussive activity in dosage unit form comprising a pharmaceutical carrier and from about 10 mg. to about 100 mg. of a chemical compound of the formula:

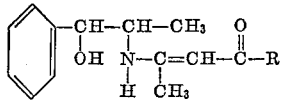

wherein:
R is a lower alkoxy group containing from 1 to 4 carbon atoms or a di-loweralkylamino group in which the loweralkyl group contains from 1 to 4 carbon atoms.

2. The composition of Claim 1 wherein the compound is 3-(β-hydroxy - α - methylphenethyl)aminocrotonic acid, t-butyl ester.

3. The composition of Claim 1 wherein the compound is N,N-diethyl - 3 - (β-hydroxy-α-methylphenethylamino) crotonamide.

4. The composition of Claim 1 wherein the compound is 3-(β-hydroxy-α-methylphenethyl)aminocrotonic acid, ethyl ester.

5. A method of producing antitussive activity comprising administering internally to animals in need of cough relief an antitussive amount of a compound of the formula:

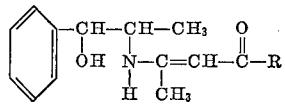

wherein:
R is a lower alkoxy group containing from 1 to 4 carbon atoms or a di-loweralkylamino group in which the loweralkyl group contains from 1 to 4 carbon atoms.

References Cited
UNITED STATES PATENTS 3,689,524  9/1972  Jack et al. _____ 260—471 A
3,732,300  5/1973  Lunts et al. _____ 424—309

ALBERT T. MEYERS, Primary Examiner
N. A. DREZIN, Assistant Examiner

U.S. Cl. X.R.
424—309, 324